United States Patent
Bress et al.

(10) Patent No.: US 10,357,708 B2
(45) Date of Patent: Jul. 23, 2019

(54) SYSTEMS AND METHODS FOR NON-SYNCHRONOUS COOPERATIVE AND COMPETITIVE PLAY ON MULTIPLE CONNECTED PINBALL MACHINES

(71) Applicants: Steve Bress, Germantown, MD (US); Daniel Bress, Germantown, MD (US); James Edward Dunstan, Nokesville, MD (US); Mark Bernard Jacobs, Fairfax Station, VA (US)

(72) Inventors: Steve Bress, Germantown, MD (US); Daniel Bress, Germantown, MD (US); James Edward Dunstan, Nokesville, MD (US); Mark Bernard Jacobs, Fairfax Station, VA (US)

( * ) Notice: Subject to any disclaimer, the term of this patent is extended or adjusted under 35 U.S.C. 154(b) by 118 days.

(21) Appl. No.: 15/727,632

(22) Filed: Oct. 8, 2017

(65) Prior Publication Data

US 2018/0111041 A1   Apr. 26, 2018

Related U.S. Application Data

(60) Provisional application No. 62/412,832, filed on Oct. 26, 2016.

(51) Int. Cl.

| | |
|---|---|
| *A63F 13/35* | (2014.01) |
| *A63F 7/02* | (2006.01) |
| *A63F 13/65* | (2014.01) |
| *A63F 13/847* | (2014.01) |
| *A63F 13/795* | (2014.01) |
| *A63F 11/00* | (2006.01) |

(52) U.S. Cl.
CPC .............. *A63F 7/027* (2013.01); *A63F 13/35* (2014.09); *A63F 13/65* (2014.09); *A63F 13/795* (2014.09); *A63F 13/847* (2014.09); *A63F 2011/0095* (2013.01)

(58) Field of Classification Search
USPC ............................................................ 463/7
See application file for complete search history.

(56) References Cited

U.S. PATENT DOCUMENTS

| | | | | |
|---|---|---|---|---|
| 5,890,715 A | * | 4/1999 | Gomez | A63F 7/027 273/118 A |
| 2013/0300058 A1 | * | 11/2013 | Stellenberg | A63F 7/027 273/121 A |
| 2015/0335994 A1 | * | 11/2015 | Guarnieri | A63F 7/30 273/121 A |
| 2017/0001100 A1 | * | 1/2017 | Stellenberg | G07F 17/3211 |
| 2018/0207516 A1 | * | 7/2018 | Stellenberg | G07F 17/3211 |

* cited by examiner

*Primary Examiner* — Pierre E Elisca

(57) ABSTRACT

The present invention is directed at enhancing pinball gameplay through non-synchronous multiplayer competitive and cooperative play. In the primary embodiment this is achieved by treating the logic and circuitry of an individual pinball machine as a "Client," that is connected to a server or "Host". The Host is in bidirectional communication with the individual pinball machines or Clients. The status of the Client, such as score, progress on completing features and other game metrics may be communicated to the Host at predetermined intervals. These game metrics may be communicated by the Host to all Clients. When a gameplay objective is completed on a client, the player is presented with a gameplay choice. This choice may be to change the status of his Client or change the status of another player's Client.

4 Claims, 3 Drawing Sheets

SYSTEMS AND METHODS FOR NON-SYNCHRONOUS COOPERATIVE AND COMPETITIVE PLAY ON MULTIPLE CONNECTED PINBALL MACHINES

BACKGROUND OF THE INVENTION

Field of the Invention

The present invention relates to pinball machines and, more specifically, to systems and methods for non-synchronous cooperative and competitive play on multiple connected pinball machines.

Related Patents

"Linkable Pinball Machine" U.S. Pat. No. 5,890,715 which is hereby incorporated by reference in its entirety, describes synchronous systems and methods to link pinball machines for cooperative or competitive gameplay.

Description of Related Art

Pinball games typically consist of an inclined play field supporting a rolling ball, player operated-flippers and a plurality of play features such as targets, ramps, bumpers, gates and the like mounted on the playfield. A typical object of pinball games is for a player to direct pinballs at selected play features or targets to score points. It is desirable for pinball game manufacturers to design pinball machines with new and innovative game-play to stimulate player interest. Gomez et al. U.S. Pat. No. 5,890,715 "Linkable Pinball Machines" (hereinafter referred to as Gomez et al) describes linkable cooperative and competitive pinball machines. The following discussion will focus on deficiencies in Gomez et al.

Direct Electrically Connections

Gomez et al. Claim 1e states "said control system including interface means for electrically connecting said similarly equipped pinball machine(s) to said control system to allow passage of information between the pinball machines."

Furthermore Gomez et al. FIG. 5A, FIG. 5B and FIG. 6 describes a direct pinball machine processor to pinball machine processor connection Gomez et al. may have problems with signal integrity with pinball machines that are not in close proximity. Additionally, Gomez et al. does not teach a system or method for linking pinball machines that are in different physical locations. There is a need in the art for a method to link pinball machines that are not in close proximity.

On Game Start Up

Please refer to Gomez et al. FIGS. 4 and 7. If a player desires a multi-player game, and an opponent is not available Gomez et al. will teaches beginning a single player game. A player who has a preference for only playing a multi-player game, is forced to play a single-player game. A player may have a desire for playing a linked game with and only with a particular individual. However, Gomez et al. FIG. 7 teaches that all players who desire to play a linked game who press "start" before a timer has expired will play a linked game together.

Just as a novice pool player may not enjoy playing a game of pool against a "pool shark" so a novice pinball player may not enjoy playing a linked game with a "pinball wizard". Gomez et al. does not teach a method of matching players by skill level or any other criteria.

There is a need in the art for a method that enables a player to choose with whom the player desires to play a game session with.

Pinball Machine Variation

Gomez Linked Pins have an identical processor-based game program, but that does not mean that every pinball machine is identical. For example, one machine may have a dirty playfield, which in turn impedes the movement of a pinball, and thus possibly giving a player of that machine a disadvantage. Of two linked machines, one may have a higher playfield angle than another, thus the game play will not be similar on both machines, and perhaps giving one player an advantage. Additionally, a playfield feature on one machine may be broken or performing sub-optimally, such as a weak flipper. The key observation is that having identical processor-based game programs does not guarantee that a fair, or fun linked game. Players maliciously modifying game play (hacking) is a known problem for casino type games. It is conceivable that some players might attempt to hack linked machines to benefit themselves.

There is a need in the art to determine that competitive pinball machines are operating within predetermined parameters.

Player ID

Gomez et al. teaches giving a player a unique ID for tournament play. However a poor player may pay an expert player to participate in a tournament for him. If players are given an opportunity to cheat, a small subset of them will find a method to do so.

There is a need in the art to better identify a pinball machine player, particularly in tournaments that are conducted remotely.

Linked Features

Gomez et al. emphasizes linking gameplay features on multi-play machines. "For these two reasons, the linking of features between machines, even in competitive modes of gameplay, is far more advantageous than keeping the completion of features separate." (col 2, lines 38-41) "Synchronization is an important part of the invention." (col 6, line 20) "Features on the pinball machines are synchronized to make gameplay more attractive to players. Cooperative or competitive gameplay can be provided between the pinball machines, but achievement of goals on the two machines is synchronized to maintain similar gameplay on both machines at any particular time." (Abstract) Applicants disagree with Gomez et al. that synchronized machines provided more attractive gameplay. Accordingly there is a need in the art for non-synchronized gameplay. An additional deficiency with linked features that Gomez et al. teaches is that it reduces the choices available to a player. For example, after a player completes a feature, the player may appreciate enhanced gameplay where a choice between negatively affecting his opponent or positively affecting himself is provided. Accordingly there is a need in the art for means for non-synchronized machines and a means to input a choice of actions following completion of a feature.

Identical Pinball Machines

Gomez et al. states "said control system including interface means for electrically connecting said similarly equipped pinball machine(s) . . ." (Claim 1e); "A method of playing a game on a plurality of similarly equipped pinball machines . . . " (Claim 7); " . . . a second configuration wherein said pinball machine is in electrical communication with at least one similarly equipped pinball machine . . . " (Claim 12). In light of Gomez et al "Detailed Description of the Preferred Embodiments" Applicants understand that "similarly equipped pinball machine" means machines with identical game electronics and game features. Applicants believe that non-identical pinball machines can enhance cooperative and competitive pinball gameplay. Accordingly there is a need in the art for systems and methods to link non-identical pinball machines for cooperative and competitive gameplay.

SUMMARY OF THE INVENTION

The present invention is directed at enhancing pinball gameplay through the addition of non-synchronous multi-player competitive and cooperative play. In the primary embodiment this is achieved by treating the logic and circuitry of an individual pinball machine as a "Client," that is connected to a server or "Host". This connection could be through the internet. The Host is in bidirectional communication with the individual pinball machines or Clients. The status of the Client, such as score, progress on completing features and other game metrics may be communicated to the Host at predetermined intervals. These game metrics may be communicated by the Host to all Clients. When a gameplay objective is completed on a client, the player is presented with a gameplay choice. This choice may be to change the status of his Client or change the status of another player's Client.

In another embodiment when a gameplay objected is completed on a client, the gameplay choice may affect a subset of all clients.

In another embodiment not all of the pinball machines are identical. Each pinball may have different targets, features, gameplay, etc. Additionally, in the case of three of more linked pinball machines, some may be identical and others may not.

In another embodiment a match making system is displayed to a potential player.

In a further embodiment, the match making system is available to a player without a prior financial transaction.

In a further embodiment, the match making system can be limited to a predetermined subset of available potential matches.

In another embodiment there are means for the Host to determine if a Client is operating within predetermined parameters. These predetermined parameters may include the proper angle of a playfield, the proper operation of game board targets, the proper operation of the Client's gameplay logic, etc.

In another embodiment, there is means for a host to change the gameplay logic on a Client. This may be to install an update or patch. This may also be to allow a player to choose between different gameplay logic on their machine.

In another embodiment there is means for the host to verify the identification of a player. In the case of tournament and other ranked gameplay it is important that players are identified. This identification may be accomplished by biometrics such as a fingerprint reader, facial recognition, etc.

In a further embodiment there are means for a Host to conduct a Tournament. Once there are means to identify the individual playing a Client, then a single tournament can be conducted at a plurality of physical locations.

In another embodiment there are means for the Host to display an attract mode, spectator display, match making information, etc. on video displays that are not physically associated with a pinball machine. For example these displays could be in a food court of a mall, or over a bar.

In another embodiment there are means for the Host to display game metrics, such as High Scores, Tournament Winners, etc. on a client. These game metrics may be from all clients connected to the Host or from a subset of clients. For example, an arcade operator may desire to display game metrics from only his locations.

In another embodiment there are means for the Host to access a player's character information in a second game such as a massively multiplayer online game. For example, the individual playing a Client may have a character in "World of Warcraft." The player may direct the host to access their "World of Warcraft" character information. The host may access character metrics, such as WoW character "level", "skills", available "spells", available gear, character graphics, etc.

In a further embodiment there are means for a Host to change the gameplay logic on a client. For example, if a player's WoW Character is a "Shaman" completion of a specific client gameplay objective may be a "healing" or beneficial spell. On the same client, if a player's WoW Character is a "Mage", completion of the same specific client gameplay objective may be mapped to an "arcane bolt" or harmful spell. In the case of a "healing" spell, the player may direct a client's score to be increased. In the case of a harmful spell, the player may direct a client's score to be decreased.

In a further embodiment there are means for the Host to communicate the results of a pinball game with a second game. For example, an individual may play a pinball game with character metrics derived from a second game, such as World of Warcraft. After playing said pinball game, the results of the pinball game are communicated with the second game.

In a further embodiment there are means for the second game to change the second game's player character information based on the results of the first game. For example, after winning five games in the first game, pinball, a player may be awarded an "achievement" in a second game, such as "World of Warcraft".

Other technical advantages will be readily apparent to one skilled in the art from the following figures, descriptions and claims. Moreover, while specific advantages have been enumerated above, various embodiments may include all, some or none of the enumerated advantages.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
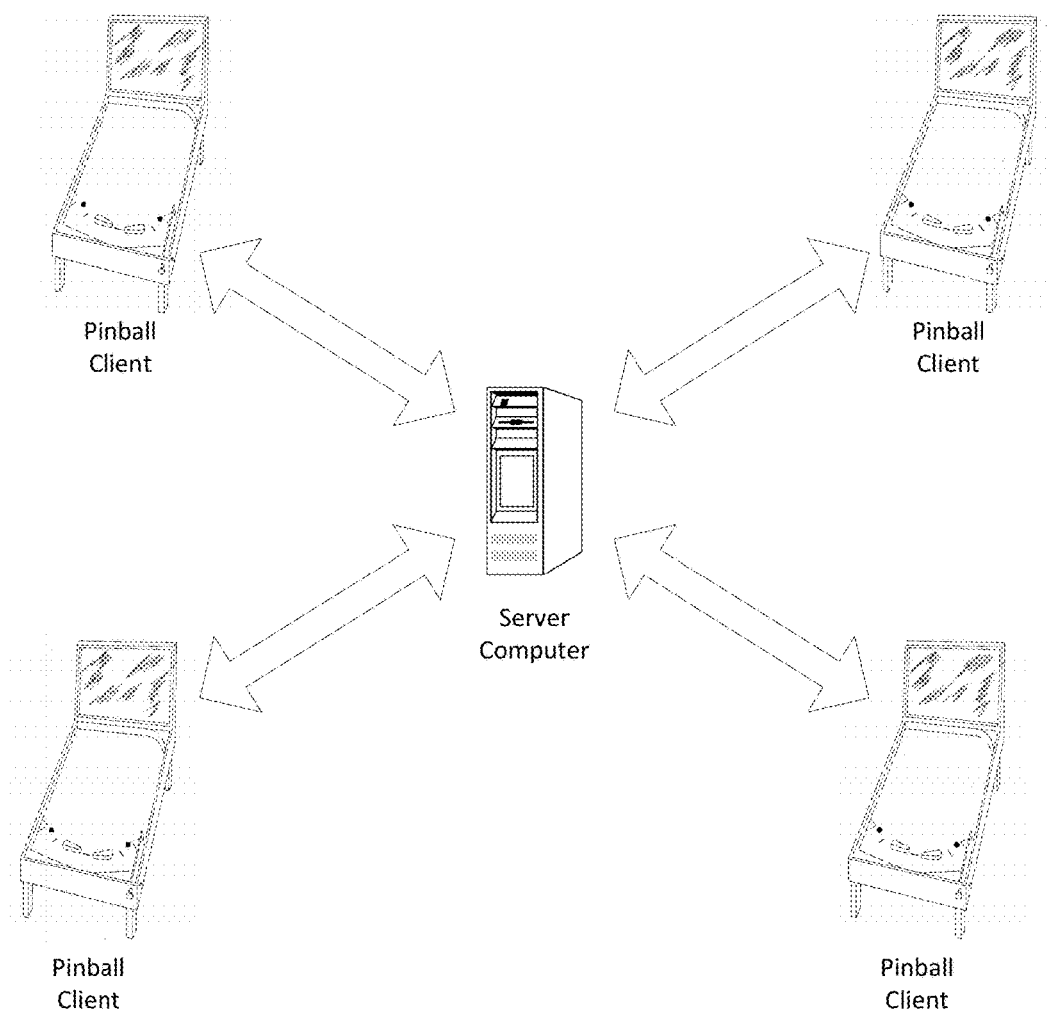
FIG. 1 is a diagram illustrating a pinball server-client relationship.

A multiplayer cooperative and/or competitive pinball machine system is described herein using client/host game architecture. A client/host game consists of individual player's pinball machines (known as a Client) connected to a server (known as a Host). The topology of a four-player Client/Host game is shown in FIG. 1.

Definitions

Attract Mode. A Pinball Machine that is not being played may go into attract mode which is intended to attract passersby to play the game.

Feature. Features include Pop Bumpers, switches, targets, etc. that may be activated by a pinball, typically to score points. For sake of clarity Applicant's refer to Feature as being a physical device which can be activated by a pinball.

Note: that Gomez et al. uses this Meaning of Feature as well as what Applicants consider Gameplay Feature or Gameplay Objective.

Gameplay Choice. Options presented to a player. For example if a player completes a Gameplay Objective he may be offered a choice to change the Game Status of his machine or a second machine. Note that this is in contrast to Gomez et al. which automatically changes the game status of all linked machines when a Gameplay Objective is completed on one.

Gameplay Feature. Same as Gameplay Objective.

Gameplay Logic. The rules of the game. For example, in FIG. 2 activating target 240 may increase the game score by 50 points.

Figure 2:
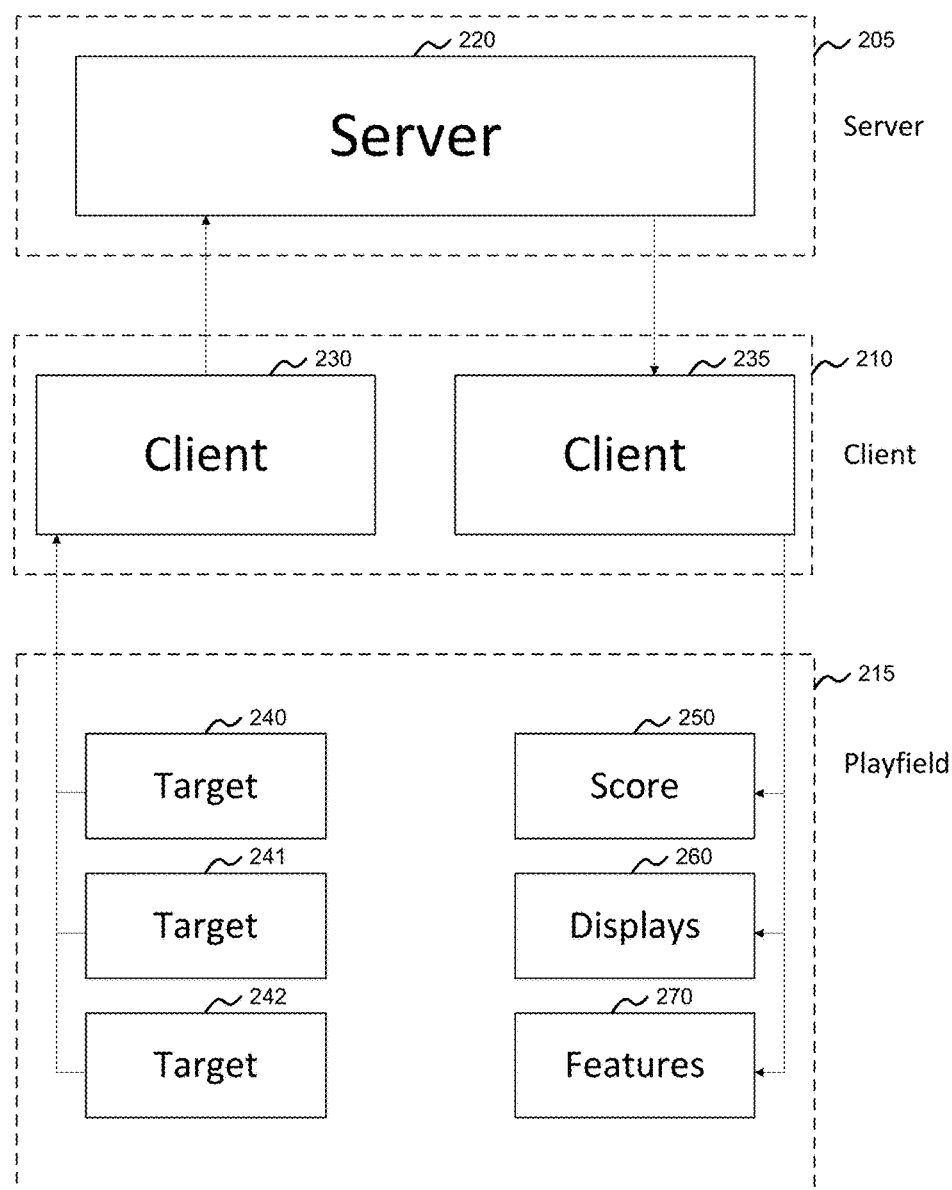
FIG. 2 is a block diagram illustrating a pinball server-client relationship.

Gameplay Metric. Gameplay Metric is a way to measure progress in a game. Typically this refers to a game Score. A game may have a plurality of Gameplay Metrics. In FIG. 2, activating target 240 may increase the Score by 50 points, while activating target 241 may increase a second metric called "Power".

Gameplay Objective. A Gameplay Objective is a goal, typically involving multiple targets or Features which a player may complete to change a game's status. For example, referring to FIG. 2, hitting targets 240, 241 and, 242 may change the game status to a two-times score multiplier.

Game Status. Game Status refers to the state of the game. This may include Game Metrics, such as Score. It may also include progress toward Gameplay Objectives. Additionally it may include the state of other aspects of the game. For example, Applicants have systems and methods to the control the power of Features such as Flippers. Game Status may refer to therefore refer to the current power setting of Flippers, such as ninety-percent.

Identical Pinball Machines. Identical Pinball Machines are machines with the same Playfield Devices, such as Flippers, Pop Bumpers, Targets, etc. wherein said Playfield Devices have identical spacial relationships and the logic and circuitry component of the Pinball Machines uses the same Gameplay Logic.

Match Making. A system to find compatible players for a multiplayer game.

Ruleset. The rules of the game. For example, in FIG. 2 activating target 240 may increase the game score by 50 points.

FIG. 1 illustrates the topology of a four-player Client/Host Pinball game system. During game play each Pinball Client communicates with the Host. Gameplay logic resides on the Client and a further subset of gameplay logic resides on the Host.

The following example is intended to illustrate, but not limit the current invention. FIG. 2 is a block diagram illustrating a client 210/host 200 pinball game system. In the interest of space just one client 210 is shown, in the primary embodiment of the current invention there would be a plurality of clients. In this example Playfield 225 contains the usual features one finds on a pinball machine, targets, score display, other displays such as lights indicating a bonus and features such as a ramp that may be in a up (locked) or down (unlocked) position. Targets 240, 241 and 242 are simple switch targets. The client logic and circuitry 220 is responsible for monitoring changes in the state of some items on the playfield, such a target being hit. Client logic and circuitry 220 may send a message to the Host 200 of these changes. The Host may direct Client logic and circuitry 220 to change the state of a Client's Gameplay status, such as score 250, displays 260 or features 270.

The following example describes a two player embodiment of the current invention, to illustrate but not limit the current invention. If Player One hits a target on his Client, Player One's Client may associate that hit with an increase in score. This increase in Player One's score may be communicated to the Host. The Host may communicate Player One's increase in score to Player Two. Furthermore, Player One's Client logic and circuitry may determine that hitting the target completes a Gameplay Objective. In this case Player One's Client would present Player One with a gameplay choice, for example, increasing one of Player One's gameplay metrics or decreasing one of Player Two's gameplay metrics. If Player One's choice only affects Player One's game status, the client makes the change. If Player One's choice affects Player Two's game status, the choice is communicated to the Host. The Host then changes the game status of Player Two's client, such as modifying a score or unlocking a Gameplay Feature. Gameplay examples to illustrate but not limit the current invention: NASCAR Multiplayer Pinball, Pyramid Builders Multiplayer Pinball and World of Warcraft Multiplayer Pinball Rulesets are below.

Currently Pinball competition between players is measured by a score. Current state of the art allows Pinball competition to be measured in other fashions, such as a Race. For example a Pinball competition may be decided by the Player who crosses a finish line first. Multiplayer Arcade Video Game racing games are known in the art and very popular. Using a pinball machine as a component to a racing game is not known in the art.

One embodiment is a NASCAR® based game as described below. The goal of this game would is to cross the finish line first, not accumulate a high score. A very basic version of this game has two Gameplay components: racing speed and pit breaks. Racing speed is determined by a mathematical formula such as (points/second multiplied by a constant=miles per hour). The host would calculate this formula and direct the clients to display each player's car in relation to each other on the video display.

An additional complication would be tire degradation. Tire degradation could be calculated by a formula such as (1 second played=0.5% tire degradation.) When a tire is below a fixed percentage, such as 80 percent, it would have a chance to "blow out". A "blow out" is detrimental to a player. For example it may mean while in blow out mode a player's score multiplied by sixty percent for 20 seconds and then automatically comes out of blow out mode. Or it may unlock a disadvantageous feature or mode.

To avoid a "blow out" a player could replace his tires by a "pit stop". A player would enter pit stop mode by completing a sequence of events or Gameplay Objective, such as hitting targets 240, 241 and 242 in sequence. Once in pit stop mode a player would have his score multiplied by eighty percent, and automatically leave pit stop mode after five seconds. In this case after the Client recognizes the "Pit Stop" Gameplay Objective has been achieved, the Player is given a Gameplay Choice. In this case the Gameplay Choice is whether to enter "Pit Stop Mode" or not. In this case, since the Client's Game Status alone is affected, the Client makes the changes.

In another embodiment the Gameplay Choice is to enter "Pit Stop Mode" for Player One or cause 5% Tire Degradation to Player Two's tires. In this case Client One would communicate the choice to the Host and the Host would communicate to Client Two to make appropriate changes.

Multiplayer Games Between Non-Identical Pinball Machines

Identical Pinball Machines are machines with the same Playfield Devices, such as Flippers, Pop Bumpers, Targets, etc. wherein said Playfield Devices have identical spacial relationships and the logic and circuitry component of the Pinball Machines uses the same Gameplay Logic. Identical Pinball Machines need not have identical artwork. Furthermore mirror image pinball machines would be considered identical, as gameplay features and logic is not affected by mirroring. As some players favor their left hand, their gameplay experience may be enhanced with a mirror image pinball machine.

Below is a detailed description of a multiplayer competitive game between non-identical pinball machines inspired by the multiplayer game "World of Warcraft". Additionally, below is a detailed description of a multiplayer cooperative game between non-identical pinball machines called "Pyramid Builders." It is inherently difficult to balance multiplayer games between non-identical pinball machines. One solution is to have the Client pass on a plurality of game metrics to the Host. Hosts can then compile and communicate these metrics to the game designers. If changes in a game's rules are required to balance a game for multiplayer games, an update is easily pushed to a Client. The key observation is that through Client/Host architecture it is cost effective to modify gameplay on a regular basis, thus extending Player satisfaction. One knowledgeable in the art would understand that a Client could have different rulesets for solo and multigame play.

Game Initiation and Matchmaking

Figure 3:
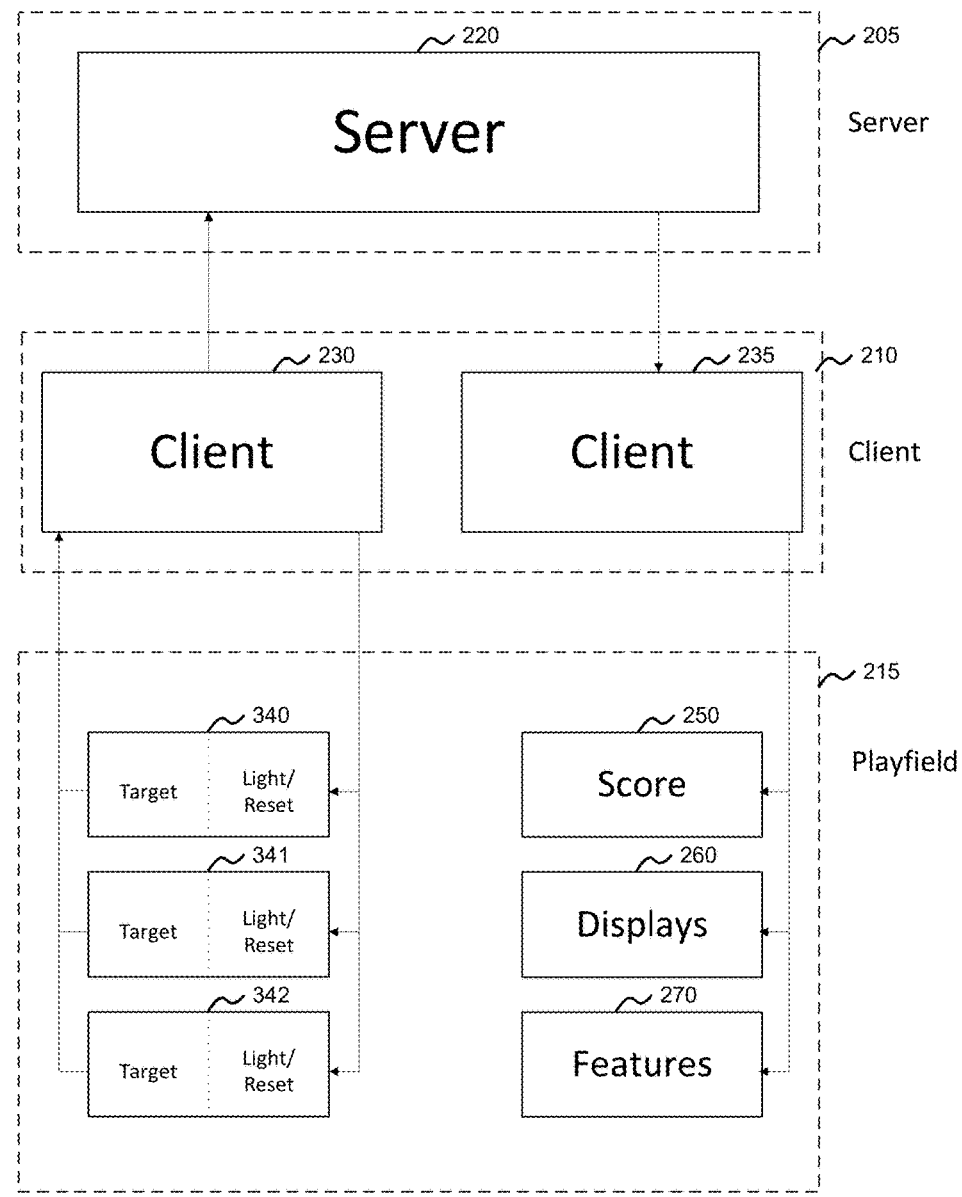
FIG. 3 is a flow chart illustrating one embodiment of game initiation.

One embodiment of pinball game initiation is shown in FIG. 3. A Player makes a successful financial transaction 901. The Player is asked if she desires a Multiplayer Game 902. If not a Single Player game is initiated 911. The player then provides some form of identification 904. The Client performs a self-diagnostic test 905. The identification and results of the diagnostic test is sent to the Host. 907. If the diagnostic test fails 907 the Player is given a choice for solo play or to have their financial transaction refunded 912.

If the Client Diagnostic Test is acceptable 907 and there the Host is currently conducting a Tournament 915 the Player is offered the choice to engage in Tournament Play 916.

If the Player does not choose Tournament Play 916 the Host determines if there are non-Tournament Multiplayer Opponents available 909. If there are not non-Tournament Multiplayer Opponents available 909 the Player is offered a choice between playing a solo game or having their financial transaction refunded 919. In another embodiment game initiation may begin without a financial transaction. In the above example the player would start with 902, and a financial transaction would be required before initiating gameplay.

In another embodiment, the player may be given the choice of joining one of a plurality of tournaments.

In another embodiment the potential game choices shown to a player is limited to a predetermined subset of available game choices. For example, a particular brick & mortal location may be holding a tournament limited to pinball machines limited to pinball machines in their physical location. In a similar fashion a chain of brick and mortar location may want to limit tournament participation to machines in their chain locations. One knowledgeable in the art would recognize that there are a number of metrics to choose from to create a predetermined subset of available game choices.

In another embodiment Players will be presented with a choice of potential opponents. In another embodiment Players will be able to search for potential opponents using a plurality of search features.

To allow for user input, additional physical input devices may be added to a "standard" pinball machine, for example a touch-screen device located in the pinball machine near the player. In another embodiment may be a means for the pinball machine system to communication with a player's personal digital device, such as a cellphone.

Client Performing with Pre-Determined Parameters

In another embodiment there may be means for the Host to determine if a Client is operating within predetermined parameters. These predetermined parameters may include the proper angle of a playfield, the friction of a pinball moving on the playfield, voltage, the proper operation of game board targets, the proper operation of the Client's gameplay logic, etc.

One knowledgeable in the art would understand that there are multiple ways to determine if a Client's playfield angle is within predetermined parameters. For example to illustrate and not limit the current invention, the angle of a playfield may be determined by an accelerometer sensor attached to the playfield or two mercury switches, each mercury switch attached to the playfield at a different angle.

The friction of a pinball moving on the playfield, or how quickly a pinball moves with just the force of gravity on it may be determined by a means to release a pinball near the top of a pinball machine playfield and means such as a video camera to determine how fast the pinball moves a predetermined distance on the playfield. If the pinball is moving too slowly it may indicate that the playfield angle is incorrect or that the playfield needs to be cleaned.

One knowledgeable in the art would understand that voltage available at a particular electrical outlet that a pinball machine is plugged into may vary due to a number of factors. Varying voltage may affect the operation of a pinball machine's gameplay feature's operation, such as the strength of a flipper swing. To ensure fairness between players it is important that voltages between competing machines are similar.

Multiple Rule Sets

In another embodiment, there is means for a Host to change the Gameplay Logic on a Client. The Gameplay Logic may be changed to update or patch an existing game. The Gameplay Logic may be changed to reflect a Handicap given to one player during a particular Handicapped-enabled game, or to change from a first game to a second game.

In one embodiment a player may be presented with a choice of multiple games which can be played on the Client. Thus the physical components of a pinball machine client may not change but the logic may. For example, in a first game a Client may credit 10 points when it receives a Target 240 hit message, in a second game the Client may credit 5 points, and/or the Client may determine a feature has been unlocked. In addition to Gameplay Logic one knowledge in the art would recognize that digital artwork on a Client may be changed by a Host. In another embodiment, the particular game a pinball plays may be settable by an operator, who may change the artwork on the pinball machine box to reflect a particular game. Retrofitting pinball machines is known in the art. The Client/Host architecture allows an alternative to traditional retrofitting, for a minimal cost to an operator, thus extending the life of a particular pinball machine through increased player interest.

Player Identification

In another embodiment there is means for the host to verify the identification of a player. In the case of tournament and other ranked gameplay it is important that players are identified. This identification may be accomplished by biometrics. Biometric identifiers include physiological characteristics such as, but not limited to, fingerprints, palm print, hand geometry and facial recognition. Additionally identification may be accomplished by behavior patterns, such as voice or pressure patterns on a weight sensor. Additionally player identification may be accomplished by an RFID device or Quick Response Code.

The primary embodiment is player identification via facial recognition. Positioning a video input device on a pinball machine is easy and inexpensive to do, such as in the back box. Facial Recognition may reside on a Server. This is a relatively inexpensive solution especially when Tournament participants are in a plurality of physical locations. Facial Recognition along with other improvements taught by the current invention would allow Tournaments to be conducted by multiple players located in their homes.

Tournaments

Pinball Tournaments conducted at the same physical location are known in the art. The advantage of the current invention is that a single Tournament may be conducted at a plurality of locations. The current invention is able to verify that a particular Client pinball machine is operating to Tournament Parameters and that the correct Player is playing the Client. The current invention is additionally able to keep track of Tournament Player's scores and other game metrics.

Attract Mode and Spectator Display

In another embodiment there are means for the Host to display an attract mode, spectator display, match making information, etc. on video displays that are not physically associated with a pinball machine. For example these displays could be in a food court of a mall, or over a bar.

Additionally, a larger Video Display Device could be positioned over a bank of pinball machines. This large display may be placed anywhere and could be run by the server. These displays could be run from a server, enabling them to be updated continuously. Additionally Gameplay Rules and other information like High Scores may be on a video monitor near the Pinball Machines.

In some pinball arcades there are times when a Player must wait for a Pinball Machine to become available. In this situation, the Player may be notified that a machine is available by a Host run video display.

A Host run video attract mode may include tournament information, images from various locations, images of pinball players themselves, and handicaps of Players waiting for multiplayer games, among others. Additionally to make pinball more exciting to watch images may be displayed of current games in progress.

Display Game Metrics

In another embodiment there are means for the Host to display game metrics, such as High Scores of the day/week/month/year, and additionally means to display Tournament Metrics, such as Tournament Winners and information on future Tournaments on a client. These game metrics may be from all clients connected to the Host or from a subset of clients. For example, an arcade operator may desire to display game metrics from only his locations. Or a chain may desire to display game metrics from just chain locations. Similarly Tournament Metrics may be from all Clients connected to the Host or from a subset of clients for similar reasons.

Connect to MMO

In another embodiment the player may direct the Host to connect to a second game, such as a Massively Multiplayer Online Game. The Host may require the player to provide information such as: Character Name, Character Server, Character Faction and account name and password. The Host then retrieves the Character Information or a subset of Character Information from the Second Game.

Some individuals play both Massively Multiplayer Online Games (MMOG) as well as Pinball. Some individuals have a very strong attachment to their Characters and Factions in their MMOG. An individual's pinball experience may be enhanced by incorporating some aspect or aspects of the player's favorite MMOG character and/or Faction. For ease of discussion, and not limitation, the following discussion will focus on "World of Warcraft" (WoW) a very popular Massively Multiplayer Online Game.

With modern pinball manufacturing techniques small production runs can be profitable. One knowledgeable in the art would recognize that for a game such as WoW, pinball machines could be profitably produced for each of the two factions, Horde and Alliance. Currently WoW has 12 Classes and 13 Races. Manufacturing a pinball machine for each possible combination of Faction, Race and Class is technically possible, but may not be economically feasible. In the primary embodiment of a pinball machine able to communicate with a MMOG consistent with the current invention, the physical aspects of the pinball machine would be themed as one of the two factions, Horde or Alliance. This primary embodiment would further comprise a Video Display in the Backbox. This display may show graphics and other information about a player's specific WoW Character or Characters, thus customizing it to a player's particular WoW Character.

There are over 200 combinations of Faction, Race and Class available for a WoW Character. Producing 200 physically different pinball machines may not be economically possible; a subset of these combinations may be economically possible. For example, 12 physically different pinball machines may be economically produced, representing the 12 Classes of WoW. In a similar fashion 13 physically different pinball machines may be economically produced, representing the 13 Races of WoW.

Change Client Gameplay Logic Based on Claim 12

In another embodiment, the Host may change a Client's Gameplay Logic based on a Player's Character Information from a Second Game. In this embodiment, Gameplay Logic includes digital graphics which the Client may display. For ease of discussion, and not limitation, the following discussion will focus on WoW as the MMOG, or second game component. Additionally the following discussion will focus on two physically different machines, one machine themed for the Horde Race in WoW and one machine themed for the Alliance Race in WoW. One knowledgeable in the art would recognize that having one physical machine themed with more generic WoW graphics would be consistent with the current invention. Additionally the following discussion will focus on pinball machines that have at least one Video Display. The following discussion is to illustrate, but not limit, the current invention.

Video Graphic Changes

The Host may direct the Client to change what digital graphics are displayed based on a Player's Second Game Character. For example, the Player's Second Game Character may be displayed on a Video Display doing a plurality of Emotes based on the Client's Game State. Completing Gameplay Objectives may result in displaying video digital animations. For example, Gameplay Objective One may be named after a specific WoW Dungeon, and when a Player completes Gameplay Objective One an animation of the Player's Second Game Character entering the specific WoW Dungeon. Gameplay Objective Two may be named after a WoW Boss and when completed an animation of the Player's Second Game Character fighting the Boss is displayed.

Dungeons and Raids

A cooperative multiplayer game consistent with the current invention may simulate a Dungeon or Raid in a second game such as WoW. In a WoW themed multiplayer pinball game consistent with the current invention, a group of five players may cooperative to attempt a Dungeon Run. Hereinafter, for ease of discussion only, this will be referred to as a Pinball Dungeon. A simple embodiment of a WoW themed Pinball Dungeon game follows.

The Pinball Dungeon may involve three fights against progressively harder "Boss Encounters". When the last "Boss Encounter" is defeated, the Pinball Dungeon is over and the Players have won.

The Host would retrieve each Player Character's Hit points from WoW. As in WoW, when a Player losses all their hit points they are out of the current "Boss Encounter". When a "Boss" runs out of hit points, the Boss is defeated. At the start of each fight, each Player's Hit points are reset.

The Host would additionally retrieve four "spells" or "abilities" that each Player Character may use in WoW. For example, in WoW an "Arcane Mage" may choose to use the following "spells" in a Pinball Dungeon: "Arcane Missiles," "Arcane Blast", "Arcane Barrage" and "Slow". These "spells" are mapped to Gameplay Objectives, such that "Arcane Missiles" is mapped to Objective 1, "Arcane Blast" to Objective 2, etc.

During a "Boss Encounter" the "Boss" will cast spells which reduce the hit points of some or all Players. A Player who plays a "Healer" Character may restore these hit points by achieving a Gameplay Objective which casts a healing spell. Other Players, like an "Arcane Mage" may complete a Gameplay Objective which casts a spell which reduces the hit points of a "Boss". Casting a spell reduces a player's Score. If a player's Score would go negative, the spell is not cast.

Battlegrounds

A competitive multiplayer game consistent with the current invention may simulate a Battleground in a second game such as WoW. In a WoW themed multiplayer pinball game consistent with the current invention, two teams may attempt a competitive Battleground. Hereinafter, for ease of discussion only, this will be referred to as a Pinball Battleground.

One Battleground in WoW is "Arathi Basin" (AB). The goal in AB is to control locations on the map. While a node is controlled by one team, that point generates resource points. When a team acquires 1,600 resource points they win the battle. In Pinball Battleground, hit points, damage and healing may be done in a similar manner to Pinball Dungeon. However, when a Player's hit points are reduced to zero, the player's is deactivated for a predetermined length of time, such as fifteen seconds. After this time period, the player's hit points are restored and the player's location set to a default.

At the beginning of a Pinball Battle the player's virtual location is in a non-node location. If a player chooses to change locations, the player's Score is decreased. If this would make the player's score negative, the location change is not allowed. Spells would only be effective on players at a similar virtual node. The team with the most players at a virtual node would earn resources. The Pinball Battle may end at a predetermined length of time or by one team accumulating a predetermined number of resource points.

Duels

A very popular feature in MMO games are 1 vs. 1 Duels. Below is an example of one embodiment of a Pinball game with 1 vs. 1 Duels consistent with the current invention. For ease of discussion this will be called Pinball Duel. Following is an example to illustrate, but not limit, the current invention.

World of Warcraft® (WoW) Competitive Pinball Duel Game

Pinball Duel is a two-player competitive pinball game consistent with the current invention. Player A communicates with Client A, in one embodiment using a Bluetooth enabled phone. Player A enters a code that identifies his World of Warcraft Character and asks for potential opponents. This request is sent to the Host and Player A is presented a choice of opponents to play against. Player A chooses Player B. Player B agrees to the competition. At this point a financial transaction may take place.

Player A chooses to a Pinball Duel with his WoW character "WereRat," an arcane mage. Player B chooses his WoW Character, a warrior "Daesul." The Host acquires Character Information from WoW for both characters, which may include but is not limited to: graphic, gear, spells, hit points and abilities. The Host may then perform algorithms to metrics such as hit points and spell damage. In the current example the Host directs Player A's Client to set starting Hit Points to 80,000; map the Spell arcane blast to Gameplay Objective 1; map the Spell arcane missiles to Gameplay Objective 2; map the Spell arcane barrage to Gameplay Objective 3 and; map the Spell slow to Gameplay Objective 4. The Host further directs the Client to set the effects for the various spells. For example the spell arcane blast, Gameplay Objective 1, may be set to reduce an opponent's hit points by 5,000, and the spell Slow, Gameplay Objective 4, may be set to reduce the hit points lost by Player A by 50 percent for a period of fifteen seconds. The Host further directs the Client to set the reduction in score, for using a particular spell. For example the reduction in score for using the spell arcane blast, Gameplay Objective 1, may be set to 10,000 and the reduction in score for using the spell slow may be set to 20,000. In a similar fashion, the Host may direct the Client to set other Client metrics. In a similar manner the Host directs Player B's Client to make similar changes.

During the Pinball Duel each player can see their progress and their opponent's progress toward Gameplay Objectives. In one embodiment this would be shown on a Video Display in the back box. In a similar manner each player can see their and their opponent's, score, hit points, and possibly other metrics. The Video Display may additionally show graphics of the characters WereRat and Daesul performing action and casting spells. In one embodiment this graphic display would change due to which Gameplay Objective was closest to completion. As the example Pinball Duel starts, Player A begins working on Gameplay Objective 1, Arcane Blast. Player B seeing this starts working on his Gameplay Objective 4, Spell Reflection.

Player B completes Objective 4, his score is reduced by the appropriate amount, and the Host is notified. The effect of completing Objective 4 is that any spell cast on Player B for a 10 second period is reflected back on Player A. Player A completes Gameplay Objective 1, arcane blast, his score is reduced by 10,000 and the Host is notified. The Host takes notice that Player A cast arcane blast within the time period that spell reflection is active, reduces Player A's hit points by 5,000.

The Pinball Duel continues in a similar fashion until one Player's hit points is reduced to zero, or a predetermined time period has expired.

MMO Changes Character Information Based on Results

At the conclusion of a game, the Host may communicate the result to the second MMO game. The result may include various metrics such as kill-to-death ratio in a Competitive Game or the number of Boss Encounters won in a Cooperative Game. Based on this communication the MMO game may make changes to a player's character information.

In World of Warcraft these changes to character information may include, but are not limited to, cosmetic gear, Achievements, "Honor" points and "Valor" points. In a further embodiment, the changes the Host may communicate to the second game may result in the second game making changes to a faction's information. In World of Warcraft these changes to faction information may include, but are not limited to, Graphics displayed in a capital city, cosmetic gear members of a faction may acquire and, an area, such as a Dungeon, available to a particular faction. In another embodiment, one faction may receive a "Buff".

Handicapping

Handicapping refers to methods of equalizing the chance of winning for different players in a game. To Handicap different players, one or more gameplay metrics is necessary for each player. For example, these metrics may include: win/loss ratio, average score, etc. Thus Handicapping is only available to players who identify themselves to the current invention. These metrics would typically be held on the Host and available to a Player at any Client connected to the Host a Player chooses.

In a simple embodiment, Player A and Player B have different skill levels and wish to play a heads up game, one where high score wins. After both Players Identify themselves to the Host, the Host determines the different between their win/loss records. In this example Player A has a win/loss record of 45%, which indicates he only wins 45% of his games. Player B has a win/loss record of 55% indicating she wins 55% of her games, and is the better player. By this metric Player B is 10% better than Player A. Thus to provide a fair game every time Player B scores points, those points are multiplied by 10%.

Voice & Video

Player's may desire to see and talk to each other during a game. As pinball games require concentration on the movement of the pinball the means for communicating between players must be in the back glass or on or near the playfield. For example a video camera and microphone may be mounted in the Pinball Machine's back glass. The Back Glass may contain a video display. Video communication may be restricted to a subset or Window of the video display. Additionally the video may be projected onto a clear area of the game field. Additionally the video display may be over the play field, in the area normally reserved for gameplay rules. One skilled in the art would understand that still images may be captured using the camera and displayed in addition or in lieu of video.

Teams

In another embodiment a plurality of Players may be organized into Teams. In this case when a Client achieves a Gameplay Objective the player is offered a Gameplay Choice to affect a change for his Team or for a second Team. This Gameplay Choice is then communicated to the Host, as the Gameplay Choice affects multiple Clients. The Host then takes a predetermined action to a First Player's Team or to a Second Player's Team.

NASCAR® Pinball Machine: A Competitive Game

The following example is provided to illustrate, and not limit, the concepts of a competitive game consistent with the current invention. Racing video arcade games are well known in the art. An example of these is Sega®'s Daytona USA game. From Sega's web site "Daytona USA is a high-speed stock car racing game allows you to choose from four viewpoints on the fly to get a true racing perspective. Realistic stock car control allows drafting, controlled braking, four-wheel drifts and e acceleration. Few games have realized such a visceral thrill and emotional competitiveness to the extent that Daytona USA has. The force-feedback steering in some models has amazingly responsiveness and allows players to feel the road and the bumps and impacts of other cars. The tracks in Daytona USA are based on NASCAR driving and courses. Cabinet colors on Daytona games can vary. Comes with both Automatic and Manual Shifting." This game is controlled by a steering wheel, brake petal and gear shifter.

A Multiplayer NASCAR® Pinball Machine system is consistent with the current invention and for ease of discussion will be called NASCAR® Pinball. NASCAR® Pinball is similar to Daytona USA in that in both games the object of the game is to cross the finish line first. NASCAR® Pinball uses a pinball machine as a game controller, instead of a steering wheel, brake petal and gear shifter. Additionally NASCAR® Pinball is a strategic game. A player has to be concerned with such things as tire wear and fuel consumption. As the pinball machine does not have a steering wheel, the game's Artificial Intelligence will steer the car. Whatever the differences, the visuals displayed by both games may be very similar.

Car Speed. As with a convention pinball, hitting features in NASCAR® Pinball Machine will award points to a player. These points will be converted to a car speed by a formula such as (points/second multiplied by a constant=miles per hour). Thus the more points a player makes the faster his car goes. On some sections of the track is may be desirable to go at a reduced speed. A player could attempt to slow down his point accumulation or there may be a Gameplay Feature a player could unlock to reduce his speed for a pre-determined amount of time.

Braking. Braking could be accomplished by an easy to hit target reducing the car's speed. This target may be pressure sensitive, so that the harder it is hit, the harder the brakes are applied. Additionally a button may be added near the pinball flipper button for a player to use as to control braking. In another embodiment there would be a brake petal which a player could operate with a foot, to control braking.

Tires. An additional complication would be tire degradation. Tire degradation could be calculated by a formula such as (1 second played=0.5% tire degradation.) When a tire is below a fixed percentage, such as 80 percent, it would have a chance to "blow out". A "blow out" is detrimental to a player. For example it may mean while in blow out mode a player's score multiplied by sixty percent for 20 seconds and then automatically comes out of blow out mode. Or it may unlock a disadvantageous feature or mode. Tire wear may be displayed to a player. A player can replace his tires by a "pit stop".

Fuel. A player that runs out of fuel automatically loses the game. There is a speed range for optimal fuel consumption, which is less than top speed. Thus giving a player some strategic decisions. The amount of fuel is displayed to a player. A player can fill his fuel tank my making a "pit stop".

A player can make a "pit stop" by completing a Gameplay Feature, which leads to his ball being captured for a predetermined set of time. Once the ball is captured the player indicates whether he wants his tired changed, gas filled or both. This determines the amount of time the ball is captured. While the ball is captured he is not generating any points, hence his car's speed slows to zero. Game Length. There are a number of embodiments to end the game. It could end after a set number of "laps". It may end after a pre-determined amount of time. It could be by number of balls, as convention pinball is. For player satisfaction, and to limit the amount of time an individual game takes, the preferred solution would be to have Artificial Intelligence (AI) driven cars as well as human driven cars. This is the method that convention video arcade racing games use to determine the length of the game.

Pyramid Builders: A Cooperative Game

Pyramid Builders is an example of a multiplayer cooperative pinball game system, consistent with the current invention, for ease of discussion known as Pyramid Pins. In Pyramid Pins the playfields and logic of the Clients are different. For the ease of discussion we will assume that two individuals are playing, although each game could be played as a "stand-alone" game, or a plurality of individuals could play. One Client is themed to be a Quarry, where work crews cut the stone that will be made into the Pyramid. The other Client is themed to be Builders, where teams of men move and raise stones into place. The playfield on each machine may be completely different.

The Builder can only move stones that have been cut by the Quarry player. In a similar fashion the Quarry player may have cut enough stones to build a pyramid, but the pyramid is only built when the Builder player places the stones. In the meta-game of Pyramid Builders the object is to build a complete Pyramid in as short a time as possible. Score may also be kept on the percentage of the Pyramid that is built. The preferred embodiment would be a timed game, with a penalty for drained balls.

In the meta-game of Pyramid Pins, the workers cut stone and move stone at a nominal rate that will not build a pyramid in the time allotted. It is up to the players to hit targets, unlock Gameplay features, strategize, etc. to build a pyramid in the allotted time.

Food. Workers must have enough "food" or they will slow down, thus cutting stone slower and moving stone slower. Having excess food will not speed workers up. In predetermined time intervals a check is made to see if workers have enough food. If they do not, their speed is reduced. Additionally, a player's flipper strength may be reduced and/or a player's flippers moved further apart (making a drain ball more likely) by a mechanism such as the one taught by Grabel, et. al. U.S. Pat. No. 4,971,324. Every time period a player does not have enough food, his worker's speed is reduced. If during this check there is excess food, a player's workers and flipper condition may be restored to a previous level.

Food is gathered by completing a Gameplay Feature. That is, every time a sequence, such as hitting targets 240, 241 and 242 is completed 1 unit of "food" is added to the total food storage. A method, such as hitting a sequence and/or a button by the flipper button will allow transfer of food between players. Thus adding to the strategy of the game.

Unlocking some Gameplay Features will speed up workers. These may include "Harvest Celebration" and "Temple Built" which would only speed up workers on an individual Client. There will be some features that require both players to unlock, which would speed up workers on both machines, such as "Pharaoh Visits" and "Holy Day Celebration".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A multiplayer competitive and/or cooperative pinball machine system comprising:
   a. a plurality of pinball machines, known as Clients, wherein logic and circuitry control gameplay,
   b. logic and circuitry that controls a subset of the pinball machines' gameplay, wherein said logic and circuitry is not located in the pinball machines, said logic and circuitry known as a Server or Host,
   c. logic and circuitry that digitally allows bidirectional communication between the Host and the Clients, wherein the status of a Client is updated to the Host at predetermined intervals,
   d. logic and circuitry on each Client that monitors progress on gameplay objectives on the Client and upon a Client achieving a gameplay objective:
      1. Presents a gameplay choice to the first player,
      2. Accepts the gameplay choice of the first player,
      3. If the gameplay choice chosen by the first player only affects the first player's client, the client changes the game status of the first player's client,
      4. If the gameplay choice chosen by the player affects a second player's client, the first player's client communicates the choice to the Host, and the Host changes the game status of a second player's client,
      5. The gameplay choice chosen by the first player is communicated to the Host and the Host changes the game status on the first's player's Team status or the Host changes the game status on the second player's Team status.

2. The pinball machine system of claim one further configured to perform quality control on a client machine comprising:
   a. logic and circuitry configured to detect the tilt angle of a client playfield,
   b. logic and circuitry configured to detect line voltage a client is connected to,
   c. means to determine the speed of a pinball moving on a client playfield, comprising:
      1. a device to position a pinball on a predetermined location of the playfield,
      2. a camera positioned to view the playfield,
      3. logic and circuitry configured to determine the speed of the pinball.

3. The pinball machine system of claim one further configured to act as an input device for a second game comprising:
- a. an input device associated with a client, configured to accept alpha-numeric input from a user,
- b. logic and circuitry configured for the host to connect to a second game,
- c. a method for the host to modify the game state of a client based upon information from a second game, comprising:
    1. logging into a user's game account,
    2. choosing an avatar,
    3. analyzing the avatar's characteristics,
    4. modifying the game state of a client based on the analyzation.

4. The pinball machine system of claim one further configured to identify a user of a particular client comprising:
- a. a camera configured to image a user playing a client,
- b. a camera configured to image said client playfield,
- c. logic and circuitry configured to compare the image of a user to a verified image of an authorized user to determine if a substitution has occurred, wherein the comparison is conducted at predetermined intervals,
- d. logic and circuitry configured to store the images taken from the cameras for review.

* * * * *